(12) United States Patent
Zander et al.

(10) Patent No.: US 12,040,876 B2
(45) Date of Patent: Jul. 16, 2024

(54) BEAM MANAGEMENT FOR DEVICE-TO-DEVICE COMMUNICATION

(71) Applicant: Sony Group Corporation, Tokyo (JP)

(72) Inventors: Olof Zander, Södra Sandby (SE); Erik Bengtsson, Eslöv (SE); Fredrik Rusek, Eslöv (SE); Kun Zhao, Malmö (SE); Jose Flordelis, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/912,512

(22) PCT Filed: Mar. 30, 2021

(86) PCT No.: PCT/EP2021/058374
§ 371 (c)(1),
(2) Date: Sep. 18, 2022

(87) PCT Pub. No.: WO2021/198304
PCT Pub. Date: Oct. 7, 2021

(65) Prior Publication Data
US 2023/0140608 A1     May 4, 2023

(30) Foreign Application Priority Data
Mar. 31, 2020  (SE) .................... 2030115-6

(51) Int. Cl.
*H04W 16/28* (2009.01)
*H04B 7/06* (2006.01)
(Continued)

(52) U.S. Cl.
CPC ........... *H04B 7/088* (2013.01); *H04B 7/0695* (2013.01); *H04L 5/0048* (2013.01)

(58) Field of Classification Search
CPC ... H04L 5/0048; H04L 5/0023; H04L 5/0053; H04L 5/0051; H04L 5/0094; H04L 5/001;
(Continued)

(56) References Cited

U.S. PATENT DOCUMENTS

| 10,327,168 | B2 * | 6/2019 | Yilmaz | ................. H04W 24/08 |
| 11,764,844 | B2 * | 9/2023 | Ökvist | ................. H04L 1/0026 375/267 |

(Continued)

FOREIGN PATENT DOCUMENTS

| WO | 2016120686 A1 | 8/2016 |
| WO | 2019128873 A1 | 7/2019 |
| WO | 2020036362 A1 | 2/2020 |

OTHER PUBLICATIONS

International Search Report and Written Opinion from corresponding International Search Report PCT/EP2021/058374, mailed on Aug. 6, 2021, 17 pages.
(Continued)

*Primary Examiner* — Eva Y Puente
(74) *Attorney, Agent, or Firm* — Tucker Ellis LLP

(57) ABSTRACT

A method of operating a first wireless communication device (101) communicating with a second wireless communication device (102) on a device-to-device link (114) in accordance with a pre-established beam pair is provided. The method includes communicating at least one message (4101-4103) indicative of an activation of at least one of a first transmission (181) of first reference signals (191) from the first wireless communication device (101) to the second wireless communication device (102), or a second transmission (182) of second reference signals (192) from the second wireless communication device (102) to the first wireless communication device (101). The activation of the at least one of the first transmission (181) or the second transmission (182) is for use in beam adjustment of the pre-established
(Continued)

beam pair at the first wireless communication device (101). The method also includes participating in the at least one of the first transmission (181) or the second transmission (182) based on the communicated at least one message (4101-4103).

16 Claims, 10 Drawing Sheets

(51) Int. Cl.
*H04B 7/08* (2006.01)
*H04L 5/00* (2006.01)

(58) Field of Classification Search
CPC ..... H04L 5/005; H04L 5/0091; H04B 7/0695; H04B 7/088; H04B 7/0617; H04B 7/0626; H04B 7/0408; H04B 17/318; H04B 7/0456; H04B 7/0404; H04B 7/0417; H04B 7/0639; H04B 7/061; H04W 16/28; H04W 74/0833; H04W 24/10; H04W 4/80; H04W 76/19; H04W 4/021; H04W 88/06; H04W 4/023; H04W 4/33

USPC ........................................................ 375/267
See application file for complete search history.

(56) References Cited

U.S. PATENT DOCUMENTS

| | | | |
|---|---|---|---|
| 11,800,579 B2* | 10/2023 | Raghavan | H04B 17/318 |
| 2019/0110281 A1 | 4/2019 | Zhou | |
| 2019/0116605 A1 | 4/2019 | Luo | |
| 2019/0150133 A1 | 5/2019 | Li | |
| 2021/0160028 A1* | 5/2021 | Park | H04B 7/0695 |
| 2022/0104300 A1* | 3/2022 | Ramachandra | H04B 7/0695 |
| 2022/0116869 A1* | 4/2022 | Guo | H04W 76/27 |

OTHER PUBLICATIONS

Office Action and Search Report from corresponding Swedish Application No. 2030115-6, Nov. 3, 2020 11 pages.
Yu-Ngok Ruyue Li et al., "Beam Management in Millimeter-Wave Communications for 5G and Beyond", Jan. 22, 2020, 12 pages.
Huawei et al., "Beamforming for V2X sidelink for FR1 and FR2", 3GPP TSG RAN WG1 Ad0Hoc Meeting 1901, R1-1900862, Jan. 21-25, 2019, 5 pages.

* cited by examiner

BEAM MANAGEMENT FOR DEVICE-TO-DEVICE COMMUNICATION

TECHNICAL FIELD

Various examples generally relate to beam management at a wireless communication device for communication on a device-to-device link. Various examples specifically relate to beam adjustment at the wireless communication device, following beam establishment.

BACKGROUND

In order to proliferate the use of wireless communication, there is an attempt to increase reliability and/or data throughput of the wireless communication.

One strategy to increase reliability and/or data throughput is to operate respective wireless links at higher frequencies. For example, in the Third Generation Partnership Project (3GPP), Release 17 there are two frequency ranges FR1 (410-7125 MHZ) and FR2 (24.25-52.6 GHZ).

Multiple-input multiple-output (MIMO) techniques are sometimes used to enhance reliability and/or throughput of communication on a wireless link. Here, a transmitter node and a receiver node of a communication system both include multiple antennas that can be operated in a phase-coherent manner. Thereby, a signal can be transmitted redundantly (diversity multi-antenna mode) along multiple spatial data streams, or multiple signals can be transmitted on multiple spatial data streams (spatial multiplexing multi-antenna operational mode). Spatial data streams can be defined by focusing the transmission energy for transmitting (transmit beam, TX beam) and/or the receive sensitivity for receiving (receive beam, RX beam) to a particular spatial direction; this corresponds to beamforming. In the context of beamforming, the process of identifying the appropriate beams is often referred to as beam management.

For higher frequencies—e.g., FR2—it is typically required to employ beamforming.

For instance, beam management can include beam establishment. As part of the beam establishment, a beam pair between two nodes of a wireless communication system. This can be done without any prior knowledge on appropriate beams—as may be the case in high-mobility situations or upon activation of a wireless communication device.

To establish the beam pair, it can be required to perform one or more beam sweeps: a beam sweep is time-aligned with a transmission including a burst of reference signals (RSs). The burst defines multiple transmit repetitions of the RSs. For instance, the RSs can be transmitted along different transmit beams, for a transmit (TX) beam sweep. Alternatively or additionally, for a receive (RX) beam sweep, monitoring for the RSs can be repeatedly implemented along different RX beams.

It has been found that beam management can require significant resources on the wireless link. Further, energy consumption at nodes participating in the beam management can increase. Further, interference with other nodes in the vicinity can be caused by the beam management.

This applies, in particular, to scenarios in which multiple peer nodes communicate with each other on a device-to-device (D2D) link.

SUMMARY

Accordingly, there is a need for advanced techniques of beam management, in particular for D2D links.

This need is met by the features of the independent claims. The features of the dependent claims define embodiments.

A method of operating a first wireless communication device is provided. The first wireless communication device communicates with a second wireless communication device on a D2D link and in accordance with a preestablished beam pair. The method includes communicating at least one message. The at least one message is indicative of an activation of a least one of a first transmission or a second transmission. The first transmission includes first reference signals. The first transmission is from the first wireless communication device to the second wireless communication device. The second transmission includes second reference signals. The second transmission is from the second wireless communication device to the first wireless communication device. The activation of the at least one of the first transmission of the second transmission is for use in beam adjustment of the preestablished beam pair at the first wireless communication device. The method also includes participating in the at least one of the first transmission of the second transmission, based on the communicated at least one message.

A computer program or a computer-program product or a computer readable storage medium or a digital signal includes program code. The program code can be loaded and executed by least one processor. Executing the program code causes the at least one processor to perform a method of operating a first wireless communication device. The first wireless communication device communicates with a second wireless communication device on a D2D link and in accordance with a preestablished beam pair. The method includes communicating at least one message. The at least one message is indicative of an activation of a least one of a first transmission or a second transmission. The first transmission includes first reference signals. The first transmission is from the first wireless communication device to the second wireless communication device. The second transmission includes second reference signals. The second transmission is from the second wireless communication device to the first wireless communication device. The activation of the at least one of the first transmission of the second transmission is for use in beam adjustment of the preestablished beam pair at the first wireless communication device. The method also includes participating in the at least one of the first transmission of the second transmission, based on the communicated at least one message.

A first wireless communication device is provided. The first wireless communication device communicates with a second wireless communication device on a D2D link and in accordance with a preestablished beam pair. The first wireless communication device includes control circuitry configured to communicate at least one message. The at least one message is indicative of an activation of a least one of a first transmission or a second transmission. The first transmission includes first reference signals. The first transmission is from the first wireless communication device to the second wireless communication device. The second transmission includes second reference signals. The second transmission is from the second wireless communication device to the first wireless communication device. The activation of the at least one of the first transmission of the second transmission is for use in beam adjustment of the preestablished beam pair at the first wireless communication device. The control circuitry is also configured to participate in the at least one of the first transmission of the second transmission, based on the communicated at least one message.

A method of operating a second wireless communication device is provided. The second wireless communication devices configured to communicate with a first wireless communication device on a D2D link and in accordance with a preestablished beam pair. The method includes communicating at least one message. The method includes communicating at least one message. The at least one message is indicative of an activation of a least one of a first transmission or a second transmission. The first transmission includes first reference signals. The first transmission is from the first wireless communication device to the second wireless communication device. The second transmission includes second reference signals. The second transmission is from the second wireless communication device to the first wireless communication device. The activation of the at least one of the first transmission of the second transmission is for used in beam adjustment of the preestablished beam pair at the first wireless communication device. The method also includes participating in the at least one of the first transmission of the second transmission, based on the communicated at least one message.

A computer program or a computer-program product or a computer readable storage medium or a digital signal includes program code. The program code can be loaded and executed by least one processor. Executing the program code causes the at least one processor to perform a method of operating a second wireless communication device is provided. The second wireless communication devices configured to communicate with a first wireless communication device on a D2D link and in accordance with a preestablished beam pair. The method includes communicating at least one message. The method includes communicating at least one message. The at least one message is indicative of an activation of a least one of a first transmission or a second transmission. The first transmission includes first reference signals. The first transmission is from the first wireless communication device to the second wireless communication device. The second transmission includes second reference signals. The second transmission is from the second wireless communication device to the first wireless communication device. The activation of the at least one of the first transmission of the second transmission is for used in beam adjustment of the preestablished beam pair at the first wireless communication device. The method also includes participating in the at least one of the first transmission of the second transmission, based on the communicated at least one message.

A second wireless communication device is provided. The second wireless communication device is configured to communicate with a first wireless communication device on a D2D link in accordance with a pre-established beam pair. the second wireless communication device includes control circuitry configured to:

communicate at least one message indicative of an activation of at least one of a first transmission of first reference signals from the first wireless communication device to the second wireless communication device, or a second transmission of second reference signals from the second wireless communication device to the first wireless communication device, the activation of the at least one of the first transmission or the second transmission being for a beam adjustment of the pre-established beam pair at the first wireless communication device; and to participate in the at least one of the first transmission or the second transmission based on the at least one message.

A method of operating a node of a communications network is provided. The radio-access network of the communications network supports a sidelink between a first wireless communication device and a second wireless communication device. The method includes designating a master device being selected from the first wireless communication device and the second wireless communication device and a base station of the radio-access network. The master device is responsible for an activation of at least one of a first transmission of first reference signals from the first wireless communication device to the second wireless communication device, or a second transmission of second reference signals from the second wireless communication device to the first wireless communication device. The activation of the at least one of the first transmission or the second transmission is for a beam adjustment of the pre-established beam pair at the first wireless communication device.

A computer program or a computer-program product or a computer readable storage medium or a digital signal includes program code. The program code can be loaded and executed by least one processor. Executing the program code causes the at least one processor to perform a method of operating a node of a communications network is provided. The radio-access network of the communications network supports a sidelink between a first wireless communication device and a second wireless communication device. The method includes designating a master device being selected from the first wireless communication device and the second wireless communication device and a base station of the radio-access network. The master device is responsible for an activation of at least one of a first transmission of first reference signals from the first wireless communication device to the second wireless communication device, or a second transmission of second reference signals from the second wireless communication device to the first wireless communication device. The activation of the at least one of the first transmission or the second transmission is for a beam adjustment of the pre-established beam pair at the first wireless communication device.

A node of a communications network is provided. A radio-access network of the communications network is configured to support a sidelink between a first wireless communication device and a second wireless communication device. The node includes control circuitry configured to designate a master device being selected from the first wireless communication device and the second wireless communication device and a base station of the radio-access network. The master device is responsible for an activation of at least one of a first transmission of first reference signals from the first wireless communication device to the second wireless communication device, or a second transmission of second reference signals from the second wireless communication device to the first wireless communication device. The activation of the at least one of the first transmission or the second transmission is for a beam adjustment of the pre-established beam pair at the first wireless communication device.

It is to be understood that the features mentioned above and those yet to be explained below may be used not only in the respective combinations indicated, but also in other combinations or in isolation without departing from the scope of the disclosure.

DETAILED DESCRIPTION OF EMBODIMENTS

Figure 1:
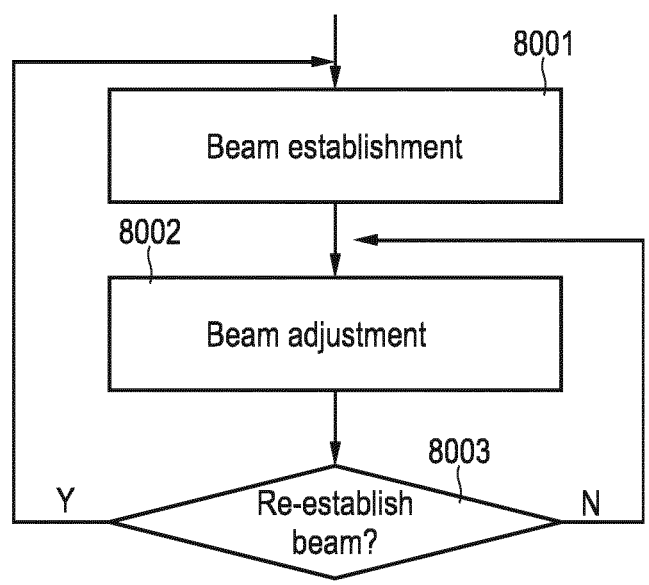
FIG. 1 schematically illustrates beam management including beam establishment and beam adjustment according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the disclosure will be described in detail with reference to the accompanying drawings. It is to be understood that the following description of embodiments is not to be taken in a limiting sense. The scope of the disclosure is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate wireless communication between nodes of a wireless communication system. In particular, the nodes can be peers, i.e., can communicate on a D2D link. For instance, the D2D link could be implemented by a sidelink of a radio-access network (RAN) of a cellular network, e.g., specified by the 3GPP. Hereinafter, for sake of simplicity, various examples will be described with respect to an example implementation of the D2D link by a sidelink between two wireless communication devices (UEs), but other scenarios are conceivable.

According to various examples, techniques are described to facilitate beam management on a sidelink. According to various examples, in particular, beam adjustment following beam establishment is described.

FIG. 1 schematically illustrates aspects with respect to beam management.

The beam management includes beam establishment 8001. For beam establishment, one or more establishment beam sweeps can be performed by the UEs communicating on the sidelink. Typically, such one or more establishment beam sweeps each include a correspondingly large count of beams, e.g., all beams available as defined by a respective antenna interface. The beam establishing 8001 yields a beam pair. A beam pair can comprise combinations of TX and RX beams at the two UEs. Thus, a beam pair is a Tx beam on one side and an Rx on the other. The beam pair may be reciprocal, then the associated beams in the opposite communication direction can be determined from a beam pair in the first direction. This would require beam correspondence at both UEs.

One or more RSs are transmitted on each one of the beams of the one or more establishment beam sweeps. Channel sounding can be implemented based on the RSs to determine the quality of the respective spatial channel defined by the respective beam. Then, based on a receive property of the one or more RSs, the beam pair can be determined.

Various examples are based on the finding that, for a sidelink, there are only two UEs involved and continuously performing the beam establishment 8001, including the establishment beam sweeps, would require significant resources on the sidelink. This can be a problem, especially as the resources on the sidelink are often limited by the RAN, e.g., to accommodate for resources for communication between the RAN and the UEs. Moreover, full establishment beam sweeps may increase the interference experienced by other UEs in the cell. This is why it is helpful to use beam adjustment.

Beam establishment is followed by beam adjustment 8002. Various of the techniques described herein are directed to the beam adjustment 8002. The beam adjustment is generally based on the beam pair established as part of the beam establishment 8001. For instance, the beam adjustment can determine whether at or around the beams of the beam pairs better beams are available. The beam adjustment thus adjusts the TX and/or RX beams of the beam pair at the respective UE. Again, RSs can be transmitted and the adjustment can be based on a receive property—e.g., amplitude or phase, signal level, etc.—of the RSs. Beam adjustment is sometimes also referred to as beam tracking or beam refinement.

Beam adjustment, as used herein, can pertain to evaluating an already established beam pair and, if required, adapting directions of one or more beams of the beam pair. As a general rule, beam adjustment can be performed for a TX beam and/or for an RX beam. Spatial filters for transmitting and/or receiving are adjusted. The beam establishment can serve as ground truth for the beam adjustment, i.e., the beams determined during beam adjustment may be derived from the beams established during beam establishment. Beam adjustment can pertain to changing beams of a pre-established beam pair used for payload data transmission.

As a general rule, RSs can have a pre-defined signal shape and/or symbol sequence. RSs can have a pre-defined transmit power. In particular, a receiver node may have prior knowledge on such transmit properties of the RSs. Then, a receiver node can perform channel sounding based on the receive property—e.g., receive amplitude or phase or angle of arrival or signal level—of the RSs. RSs are sometimes also referred to as pilot signals. A specific implementation of RSs are synchronization signals (SSs).

As a general rule, if there is a capability for beam correspondence (BC), then it is possible to transmit RSs on a TX beam and determine, both, the appropriate TX beam, as well as the appropriate RX beam based on a receive property of the RSs. On the other hand, without a capability for BC, it may be required to transmit RSs on a TX beam, as well as to receive RSs on an RX beam and determine the appropriate TX beam and RX beam based on the receive properties of the RSs transmitted and received, respectively.

Occasionally, a UE may return from beam establishment to beam adjustment (box 8003); this could happen when the UEs experience a beam failure, or even scheduled at a sparse rate to ensure adaptation of large scale channel changes.

Now, considering the case of beam adjustment 8002 at a first UE of the two UEs communicating via the sidelink: According to various examples, it is possible to communicate at least one message that is indicative of an activation of at least one of a first transmission of first RSs or a second transmission of second RSs. The first UE can then participate in the at least one of the first transmission or the second transmission based on the communicated message, i.e., in accordance with the activation. This is summarized in TAB. 1 below.

TABLE 1

Transmissions of RSs for beam adjustment at first UE; the first and second transmission can generally be deactivated altogether or cumulatively activated.

| Transmission | Direction | Details |
|---|---|---|
| First transmission of first RSs | From first UE to second UE | The first transmission may include at least one burst of the RSs. The at least one burst can be aligned with at least one TX beam sweep of the first RSs at the first UE. Different bursts can have a different count of RSs. Different bursts can be aligned with different TX beam sweeps, e.g., having different beams, different count of beams, and/or different beam widths. |
| | | The first transmission can include a single RX beam per burst at the second UE, e.g., in accordance with pre-established beam pair. Different bursts may use different RX beams. |
| | | The second UE may transmit a response message that is received by first UE. There may be one response message per burst of the first RSs; or a single response message may aggregate information across multiple bursts. The response message is indicative of an RX property of first RSs, e.g., by indicating the strongest TX beam(s), as seen by second UE, e.g., using a beam identity. The first UE may then use this strongest TX beam for transmitting, and-in case of capability for BC-use the corresponding RX beam for receiving. |
| | | A selection of the RX beam of the second UE may be transparent for the first UE. The second UE may use an RX beam that is determined based on its mobility. |
| | | The one or more beams used for the first transmission of the first RSs can be aligned with or generally determined based on the initial beam pair of the beam establishment 8001. For instance, one or more TX beams used at the first UE may be determined based on the initial TX beam at the first UE, e.g., centered around the initial TX beam, etc.. This based on the assumption that the initial beam is a good approximation of the currently best beams, i.e., serves as a valid baseline. |
| Second transmission of second RSs | From second UE to first UE | The first transmission can include an RX beam sweep at the first UE. For this, the first transmission can include at least one burst of second RSs. The at least one burst is aligned in time-domain with the at least one RX beam sweep. |
| | | The second UE may use a single TX beam, e.g., in accordance with pre-established beam pair. Different bursts may use different TX beams. |
| | | There is no need for reporting based on response message. The second UE should be stationary during the RX beam sweep (i.e., exhibit a low mobility level/assumed to be stationary during the RX beam sweep). This is because the measurement at the first UE can be based on the assumption that the second UE uses a single TX beam, i.e., transmits into a fixed and static direction; this, however, is only true if the second UE has low mobility, i.e., no or no significant mobility on the time scale of the RX beam sweep. |
| | | The one or more beams used for the second transmission of the second RSs can be aligned with or generally determined based on the initial beam pair of the beam establishment 8001. For instance, one or more RX beams used at the first UE may be determined based on the initial RX beam at the first UE, e.g., centered around the initial RX beam, etc.. This based on the assumption that the initial beam is a good approximation of the currently best beams, i.e., serves as a valid baseline. |

Referring to TAB. 1, as a general rule, the first RSs can be the same or different as the second RSs.

As indicated in TAB. 1, as a general rule, to facilitate the beam sweeps at the first UE, it is possible that the first transmission and/or the second transmission include at least one burst of the respective RSs. The burst can define a repetition of the respective RSs, e.g., with a predefined time-domain offset between adjacent repetitions. For instance, there may be a predefined time-domain offset of one or two symbols between adjacent RSs of the burst. Each RS of a burst may be indicative of the burst, e.g., be indicative of belonging to the burst. It would be possible that the RSs of a burst are indicative of their position with the burst. By using such a burst, the respective beam sweep is facilitated: e.g., multiple beams can be each assigned a respective repetition of the RSs defined by the burst.

By such techniques of selective activation of the first transmission and/or the second transmission by means of the at least one message, overhead associated with beam management can be reduced. For example, by selective activation of the first transmission and/or the second transmission, a trade-off between, firstly, interference imposed onto the spectrum, and secondly, robustness of the beam management can be addressed. It is, furthermore, possible to take into account the mobility level of the first UE and/or the second UE, as well as the capability for BC at the first UE.

In detail, the first transmission of first RSs can employ the TX beam sweep at the first UE, thereby being associated with an increased level of interference (the interference is spatially distributed into multiple directions in accordance with the beam sweep)—in particular, if compared to a scenario of a single TX beam at the second UE combined with a RX beam sweep as defined by the second transmission. Similarly, the first transmission may be associated with increased communication overhead if compared to the second transmission, by requiring the response message.

For the second transmission: By using an RX beam sweep, the interference is minimized to the spatial direction implied by the single TX beam at the second UE aligned with the spatial direction in which the first UE is located. As the first UE is responsible for its beam management (aided by the RSs), no additional overhead is needed between the first and second UEs to support the beam management at the first UE.

Where a beam correspondence capability is not provided at the first UE, it may be required to combine the first transmission and the second transmission, thereby further increasing allocation on the spectrum.

Figure 2:
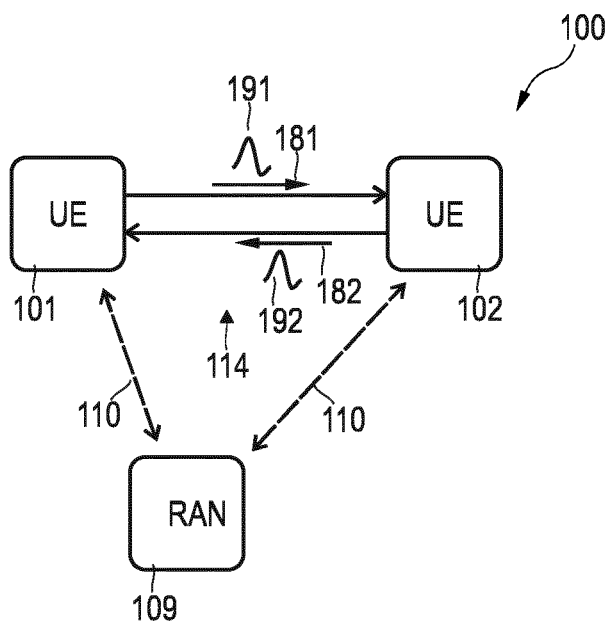
FIG. 2 schematically illustrates a communication system including two wireless communication devices communicating on a D2D link according to various examples.

FIG. 2 schematically illustrates a communication system 100. The communication system 100 includes two UEs 101, 102 that are configured to communicate with each other via a D2D link 114, here specifically a sidelink 114 of a RAN 109 of a cellular NW. For instance, the cellular network may be 3GPP-specified, e.g., 5G or upcoming 6G.

For example, the UEs 101, 102 could be selected from the group including: cell phone; a smart phone; a smart TV; Internet of things device; a machine type communication device; etc.

Communication on the sidelink 114 can employ time-division duplex (TDD) and/or frequency-division duplex (FDD). Using TDD, communication in both directions takes place at different points in time using the same frequency. Using FDD, communication in the two directions takes place at the same point in time, using different frequencies.

FIG. 2 schematically illustrates the first transmission 181 of first RSs 191 from the UE 101 to the UE 102 and, furthermore, illustrates the second transmission 182 of second RSs 192 from the UE 102 to the UE 101 (cf. TAB 1).

FIG. 2 illustrates an in-coverage scenario in which control links 110 are established between the RAN 109 and each one of the UEs 101, 102. It is also conceivable that there is an out-of-coverage scenario in which there are no control links available between the RAN 109 and both the UE's 101, 102. A mixed-coverage scenario pertains to a situation in which the control link 110 is available between the RAN 109 and a single one of the two UEs 101, 102.

The RAN 109 can include a RAN node, e.g., a base station. The base station can include control circuitry that could be implemented by a processor and a non-volatile memory. The processor can load program code that is stored in the non-volatile memory and execute the program code. Executing the program code causes the at least one processor to perform techniques as described herein, e.g.: communicating with the UE 101 on the control link 110; communicating with the UE 102 on the control link 110; designating a master UE selected from the UE 101 and the UE 102, the master UE being responsible for the activation of the first transmission 181 and/or of the second transmission 182 or, more generally, for configuration of the beam management.

Figure 3:
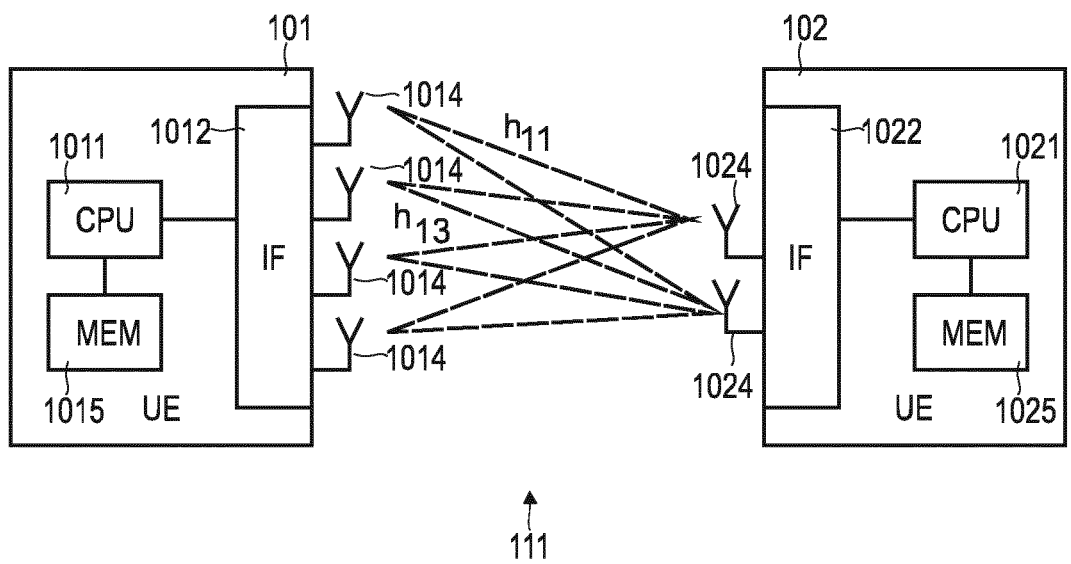
FIG. 3 schematically illustrates details of the two wireless communication devices of FIG. 2.

FIG. 3 illustrates details with respect to the UE 101. The UE 101 includes control circuitry that is implemented by a processor 1011 and a non-volatile memory 1015. The processor 1011 can load program code that is stored in the memory 1015. The processor 1011 can then execute the program code. Executing the program code causes the processor to perform techniques as described herein, e.g.: communicating on the sidelink 114; participating in the first transmission 181, i.e., transmitting the first RSs 191; participating in the second transmission 182, i.e., receiving the second RSs 192; transmitting and/or receiving (communicating) on the control link 110; communicating at least one message indicative of an activation of the first transmission 181 or the second transmission 181; performing beam management of transmit beams and/or received beams, in particular, including beam establishment 8001 and/or beam adjustment 8002 (cf. FIG. 1).

FIG. 3 also illustrates details with respect to the UE 102. The UE 102 includes control circuitry that is implemented by a processor 1021 and a non-volatile memory 1025. The processor 1021 can load program code that is stored in the memory 1025. The processor can execute the program code. Executing the program code causes the processor to perform techniques as described herein, e.g.: assisting the UE 101 for beam management at the UE 101, e.g., by participating in the first transmission 181 and/or the second transmission; communicating at least one message indicative of an activation of the first transmission 181 or the second transmission 181; etc..

FIG. 3 also illustrates details with respect to communication between the UE 101 and the UE 102 on the sidelink 114. The UE 101 includes an interface 1012 that can access and control multiple antennas 1014. Likewise, the UE 102 includes an interface 1022 that can access and control multiple antennas 1024.

The interfaces 1012, 1022 can each include one or more TX chains and or more receiver chains. For instance, such RX chains can include low noise amplifiers, analogue to digital converters, mixers, etc. Analog and/or digital beamforming would be possible.

Thereby, phase-coherent communicating can be implemented across the multiple antennas 1014, 1024. Thereby, the UE 101 and the UE 102 implement a MIMO communication system.

As a general rule, the receiver of the MIMO communication system receives a signal y that is obtained from an input signal x multiplied by the transmission matrix H. FIG. 3 includes two example labels for the components $h_{11}$ and $h_{13}$ of the transmission matrix H.

The transmission matrix H defines the channel impulse response of the sidelink 114. The rank of the transmission matrix corresponds to the number of linearly independent rows or columns and, as such, indicates how many independent data streams can be used simultaneously; this is sometimes referred to as the number of layers. The rank can be set in different MIMO transmission modes. For MIMO transmission modes, the amplitude and/or phase (antenna weights) of each one of the antennas 1014, 1024 is appropriately controlled by the interfaces 1012, 1022. According to examples, a rank equaling one can be used, for beamforming using a single TX or RX beam, respectively. By using a beam, the direction of the wave front of signals transmitted by a transmitter of the communication system is controlled. Energy is focused into a respective direction, by phase-coherent superposition of the individual signals originating from each antenna 1014, 1024. Thereby, the spatial data stream can be directed. As a general rule, alternatively or additionally to such TX beams, it is possible to employ RX beams.

The concept of beams can be used in so-called beam sweeps. Details with respect to beam sweeping are explained next in connection with FIG. 4 and FIG. 5.

Figure 4:
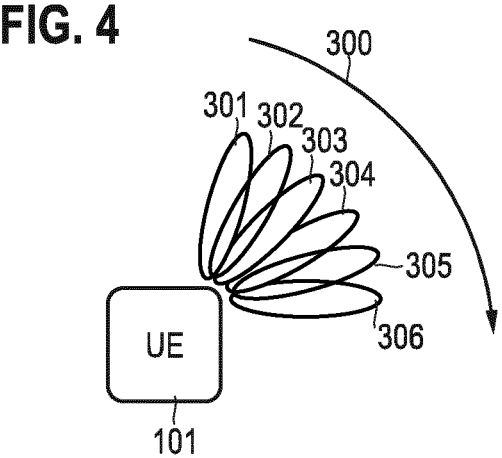
FIG. 4 schematically illustrates a TX beam sweep at a wireless communication device according to various examples.
Figure 4:
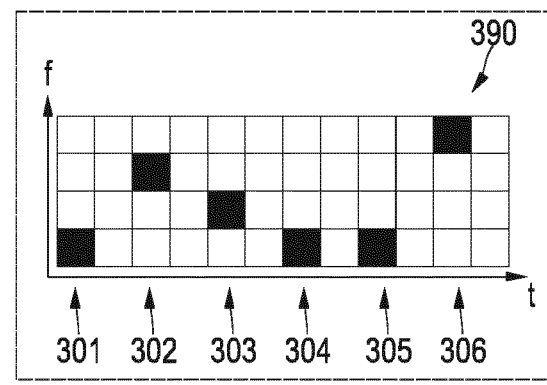

FIG. 4 schematically illustrates a TX beam sweep 300 at the UE 101. For example, the first transmission 181 (cf. FIG. 1) can include the TX beam sweep 300. The TX beam sweep 300 includes multiple TX beams 301-306, i.e., a well-defined count of TX beams 301-306. For example, it would be possible that the first RSs 191 of the first transmission 181 are transmitted on each one of the transmit beams 301-306 of the TX beam sweep 300.

The inset of FIG. 4 illustrates aspects with respect to a burst 390 of the first RSs 191. The burst 390 is defined by respective allocation of time-frequency resource elements in the time-frequency resource grid next to each other, wherein different ones of the multiple transmit beams 301-306 are activated for different time-frequency resource elements (for instance, in FIG. 4, each square could pertain to a symbol-subcarrier of an Orthogonal Frequency Division Multiple, OFDM, multiplex modulation). A predefined time-offset (here, a single resource element) is provisioned, to enable the interface 1012 to switch between the TX beams 301-306.

In some examples, it would even be possible to use nested bursts. Here, multiple first RSs 191 are transmitted on each one of the multiple TX beams 301-306. This corresponds to a top-level burst to address each TX beam 301-306, and nested bursts for each element of the top-level burst. Such use of nested bursts can be helpful in a scenario in which the TX beam sweep 300 at the UE 101 is combined with multiple RX beam sweeps at the UE 102, each RX beam sweep being time-aligned with a respective nested burst.

As a general rule, depending on the implementation—e.g., whether the interface 1012 of the UE 101 has analog beamforming capability or digital beamforming capability—the different transmit beams 301-306 may be activated consecutively (cf. inset of FIG. 4) or, at least partially, in parallel.

Figure 5:
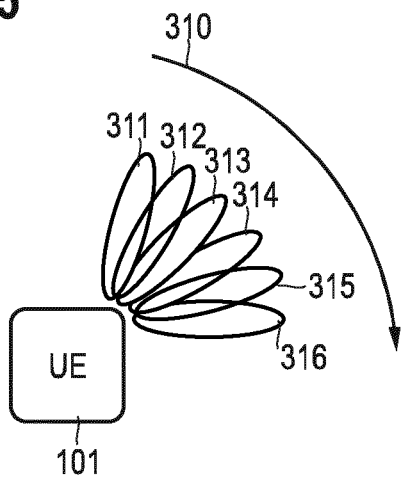
FIG. 5 schematically illustrates an RX beam sweep at a wireless communication device according to various examples.

FIG. 5 schematically illustrates a RX beam sweep 310 at the UE 101. For example, the second transmission 182 can include the RX beam sweep 310. The RX beam sweep 310 includes multiple RX beams 311-316. For example, it would be possible that the RSs 192 of the second transmission 182 are transmitted and the UE 101 attempts to receive (monitors) for the second RSs 192 on each one of the RX beams 311-316 of the RX beam sweep 310. For example, a burst 390 of the second RSs 192 may be defined (cf. inset of FIG. 4), or even possible nested bursts. Again, the RX beams 311-360 may be activated consecutively or, at least partially, in parallel.

Figure 6:
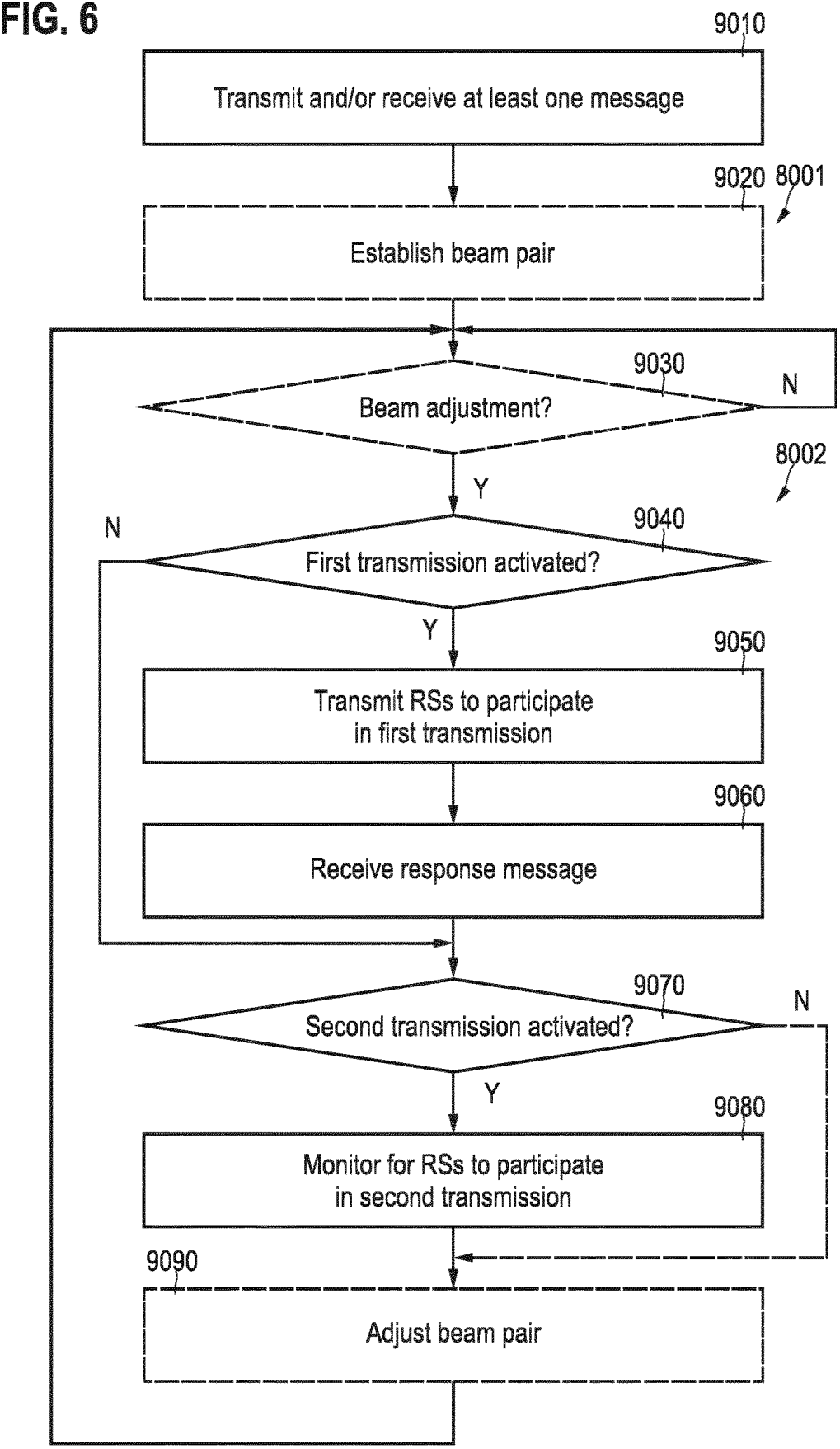
FIG. 6 is a flowchart of a method according to various examples.

FIG. 6 is a flowchart of a method according to various examples. The method of FIG. 6 may be executed by a UE. For example, the method of FIG. 6 could be executed by the UE 101, more specifically by the circuitry 1011 upon loading program code from the memory 1015. The details of the method of FIG. 6 will be explained for such as scenario of execution by the UE 101 below, for sake of simplicity; but similar techniques may be implemented for other devices and entities executing the method.

The method of FIG. 6 is for beam management at the UE 101. Accordingly, the method of FIG. 6 can help to determine a TX beam 301-306 and/or a RX beam 311-316 at the UE 101, for communicating with the UE 102.

Optional boxes are denoted with dashed lines in FIG. 6.

At box 9010, at least one message is communicated, i.e., transmitted and/or received by the UE 101. This could be, e.g., a Layer 3 control message.

The at least one message facilitates configuring the beam adjustment 8002 of the beam management. For example, the at least one message may be communicated on a control link 110 between the UE 101 and the RAN 109. Alternatively or additionally, the at least one message may be communicated on the sidelink 114 between the UE 101 and the UE 102. As a general rule, there are various options available for implementing the at least one message. For example, a single message may be used or multiple messages may be used. Where multiple messages may be used, the multiple messages may be communicated in different directions between the UE 101 and the UE 102 and/or may be communicated between the RAN 109 and the UE 101. Mixed scenarios are possible, where a first one of the at least one message is communicated on the sidelink 114, and a second one of the at least one message is communicated on the control link 110.

The at least one message is indicative of an activation of the first transmission 181 and/or of the second transmission 182. For instance, the at least one message may indicate whether the first transmission 181 and/or the second transmission 182 is active or inactive, respectively.

Activation can pertain to performing the first transmission 181 and/or the second transmission 182 upon communicating the message. The indication of the at least one message may be valid until reception of a further instance of the at least one message or until expiry of a corresponding timer, wherein the timer may be preset or may be initialized by the at least one message. The first transmission 181 and/or the second transmission 182 can be performed once; or it would be possible that the first transmission 181 and/or the second transmission 182 are re-occurring (details with respect to such an implementation are described below). It would also be possible that the first transmission 181 and/or the second transmission 182 are continuously performed upon communicating the message indicative of the activation.

As a general rule, there are various options available for implementing the at least one message to be indicative of the activation of the at least one of the first transmission 181 or the second transmission 182. The at least one message may include an explicit indicator indicative of the activation of the first transmission 181 and/or the second transmission 182. For example, a one-hot encoding may be used, e.g., according to the following scheme {[first transmission 181 activated or deactivated]; [second transmission 182 activated or deactivated]}. The at least one message may indicate time-frequency resources allocated to the first RS 191 in case the first transmission 181 is activated; and may not indicate time-frequency resources allocated to the first RS 191 in case the first transmission 181 is not activated (similarly, for the second transmission 182). The at least one message could also be indirectly indicative of the activation of the first transmission 181 and/or the second transmission 182. For instance, it would be possible that there are multiple predefined operational modes available for the beam adjustment 8002 at the first UE 101. Then, the activation of the first transmission 181 and/or the second transmission 182 can be defined by the selected or configured operational mode. In particular, the at least one message may be indicative of an indicator indicating the selected operational mode. Some of these operational modes are described in TAB. 2 below.

TABLE 2

Operational modes for defining the activation of the first transmission 181 and/or the second transmission 182. The operational modes can be predefined at both UEs 101-102. The operational modes can be specified in the communication specification and, e.g., hardcoded to respective memories of the UEs 101-102.

| Operational mode | Transmission(s) activated as defined by operational mode | Details |
|---|---|---|
| I | Second transmission 182, but not first transmission 181 | UE 101 monitors for second RSs 192 from UE 102, e.g., using multiple RX beams to implement the RX beam sweep 310. If a received second RS 192 is stronger or shows better capacity in a given RX beam different to the RX beam defined by the pre-established beam pair, the UE 101 can adjust to use the given RX beam for an upcoming data transmission. For BC capability, the UE 101 can also use the corresponding given TX beam. |
| II | First transmission 181, but not second transmission 182 | UE 101 transmits the first RSs 191 using various TX beams, i.e., uses a TX beam sweep 300. The UE 102 monitors for the first RSs 191 using a fixed RX beam and reports back the desired TX beam: the desired TX beam can be selected based on, e.g. the strongest one or the one with the best capacity, as seen from the UE 102. If UE 102 reports back a TX beam which is different from the active one, the UE 101 is expected to change the TX beam. For BC capability, the UE 101 can also use the corresponding given RX beam. |
| III | First transmission 181 and second transmission 182 | Without BC capability, both the first transmission 181, as well as the second transmission 182 are activated. The UE 102 receives the first RSs 191 in a TX beam sweep from UE 101 and reports back the desired TX beam for UE 101. The UE 102 transmits the second RSs 192 to the UE 101-e.g., using a single TX beam-which can use a RX beam sweep to identify the desired RX beam for UE 101. |
| IV | First transmission 181 and second transmission 182 | A further mode to improve robustness is to transmit a nested burst of first RSs 191 on each beam 301-306 of a TX beam sweep 300 at the UE 101. This will enable the receiving UE 102 to perform RX beam sweeps, one for each nested burst.<br>For example, mode IV may be a pre-requisite for transitioning back to the beam establishment. I.e., failure of mode IV operation may be checked at box 8003 in FIG. 1, to decide whether to fallback to beam establishment 8001. |

As described above, the at least one message is indicative of the activation of the at least one of the first transmission 181 or the second transmission 182. Alternatively or additionally, it is possible that the at least one message is indicative of one or more properties of the first transmission 181 and/or the second transmission 182. This is, however, optional—it would be possible that such properties of the first transmission 181 and/or the second transmission 182 are predefined, e.g., according to a standard. For example, a first one of the at least one message can be indicative of the activation; and a second one of the at least one message can be indicative of one or more properties of the of the first transmission 181 and/or the second transmission 182.

For example, the at least one message can be indicative of the first transmission 181 including at least one burst of the first reference signals 191. The at least one message could be indicative of the first transmission 181 including a single receive beam at the second UE 102. The at least one message could be indicative of the first transmission 181 including at least one TX beam sweep at the UE 101. The at least one message could be indicative of the first UE 101 performing the at least one TX beam sweep. The at least one message could be indicative of the second transmission 182 including at least one burst of the second reference signals 192. The at least one message could be indicative of the second transmission 182 including at least one receive beam sweep at the first UE 101. The at least one message could be indicative of the first UE 101 performing the at least one RX beam sweep. The at least one message could be indicative of the second transmission 182 including a single transmit beam at the second UE 102.

Such indication of one or more properties can be implemented indirectly, e.g., by specifying a respective operation mode as described in TAB. 2, the operational mode being associated with respective one or more properties; or directly by expressly specifying respective properties, e.g., by indicating associated values. Some examples of properties that may be indicated by the at least one message are summarized in TAB. 3.

TABLE 3

Examples of properties that can be indicated by the at least one message. It is possible that combinations of such scenarios are used. Different messages of the at least one message may indicate different properties. It is also possible that a single message indicates multiple properties.

| Scenario | Property indicated by at least one message | Details |
|---|---|---|
| 1 | Count of RSs per burst | For example, the first transmission 181 may include at least one burst 390 of the first RSs 191 and the at least one message can be indicative of the count of the first RSs 191 for each one of the at least one burst.<br>Alternatively or additionally, it would be possible that the second transmission 182 includes at least one burst 390 of the second RSs 192 and the at least one message can be indicative of the count of the second RSs 192 for each one of the at least one burst. |
| 2 | Time-frequency resources | It would be possible that the at least one message is indicative of time-frequency resources of a time-frequency resource grid allocated to the at least one of the first transmission 181 or the second transmission 182. As such, the at least one message can provide for scheduling.<br>The time-frequency resources can be indicated on the level of elements (symbol/subcarrier), or on the level of blocks (multiple elements), or otherwise.<br>It would be possible that the at least one message specifies a periodicity of re- |

TABLE 3-continued

Examples of properties that can be indicated by the at least one message. It is possible that combinations of such scenarios are used. Different messages of the at least one message may indicate different properties. It is also possible that a single message indicates multiple properties.

| Scenario | Property indicated by at least one message | Details |
|---|---|---|
| | | occurrence of the first transmission 181 and/or the second transmission 182. For example, periodicities may be specified for multiple bursts of the first transmission 181 and/or the second transmission 182. |
| 3 | Scheduling type | The first transmission 181 and/or the second transmission 182 can be re-occurring in time. For instance, the first transmission 181 and/or the second transmission 182 can be periodically re-occurring or in accordance with a timing schedule. For instance, one or more bursts 390 of the first transmission 181 and/or the second transmission 182 can be re-occurring in time.<br>The at least one message can specify whether the time-frequency resources (cf. scenario 2) for the re-occurring first transmission 181 and/or the second transmission 182 are persistently scheduled or are scheduled on-demand.<br>For instance, re-occurring time-frequency resources for multiple repetitions of the RSs could be persistently scheduled or be scheduled on demand, i.e., with a respective dedicated scheduling for each repetition. Each repetition could, e.g., pertain to a respective burst. |
| 4 | Count of beam sweeps | It would be possible that the first transmission 181 and/or the second transmission 182 include one or more TX and/or RX beam sweeps at the UE 101. It would be possible that the at least one message indicates the count of beam sweeps.<br>Different beam sweeps can include a different count of beams. Multiple beam sweeps can be arranged interleaved in time domain.<br>Different beam sweeps can be time-aligned with different bursts 390 of the first and/or second RSs 191, 192, respectively. |
| 5 | Count of beams per beam sweep | It would be possible that the count of beams per beam sweep as indicated, for a scenario in which the first transmission 181 and/or the second transmission 182 include multiple beam sweeps (cf. scenario 4). This number can correspond to the count of RSs per burst, as indicated in the scenario 1.<br>For instance, there may be pre-defined a default count of beams and an extended count of beams. Then, an information element of the at least one message can indicate whether the extended count of beams is-e.g., temporarily-activated. |
| 6 | Beam width for beams of multiple beam sweeps | For illustration, it would be possible to specify a beam width of the beams 301-306, 311-316 used in multiple beam sweeps 300, 310. For instance, different beam sweeps may rely on beams of different beam width. For example, there may be a tendency that beam sweeps employing a smaller count of beams use beams having a wider beam width, to thereby cover a corresponding solid angle of the environment, as a beam sweep employing a large count of beams having a narrower beam width. |
| 7 | Selection of specific beams | It would be possible to select specific beams available at the respective UE for a beam sweep 300, 310, from a candidate set of beams (codebook). |

At box 9020, an initial beam pair is established at the UE 101 and the UE 102. Thus, box 9020 implements the beam establishment 8001 (cf. FIG. 1). At box 9020, a TX beam and a RX beam can be determined for the UE 101; similarly, a TX beam and a RX beam can be determined for the UE 102.

The particular implementation of box 9020 is out-of-scope of this disclosure and not germane for the functioning of the various techniques described herein.

Box 9020 can be implemented using reference techniques, e.g., using one or more establishment beam sweeps. Typically, a count of beams of the establishment beam sweep is comparably large, e.g., larger than 10 or even larger than 50. Thus, the establishment beam sweeps require significant resources on the sidelink 114.

In response to establishing the initial beam pair at box 9020, the method commences with the activated first transmission 181 and/or second transmission 182, as explained in connection with boxes 9030 to 9090.

At box 9030, it is checked whether the beam adjustment 8002 is required at the UE 101. For instance, the beam adjustment 8002 may be triggered by expiry of a timer and/or upon UE mobility. Other trigger criteria are possible.

If the beam adjustment 8002 is required, then the method commences at box 9040.

At box 9040 it is checked whether the first transmission 181 is activated. This is based on the at least one message of box 9010. If the first transmission 181 is activated, then the UE 101 participates in the first transmission at box 9050, by transmitting the RSs 191. For instance, the first transmission 181 can include at least one burst 390 of the first RSs 191 and it would be possible that the at least one message of box 9010 specifies the count of the first RSs 191 for each one of the at least one burst of the first transmission 181 (cf. TAB. 3: scenario 1; scenario 5).

More specifically, it would be possible that the first transmission 181 includes at least one TX beam sweep 300 at the UE 101. The at least one TX beam sweep 300 is time-aligned with the at least one burst of the first transmission 181, as described in FIG. 4.

At box 9060, the UE 101 receives a response message from the UE 102. The response message is indicative of a receive property of the first RSs 191 transmitted at box 9050. There are various options available for implementing the response message to be indicative of the receive property of the first RSs 191. Some examples are summarized in TAB. 4 below.

TABLE 4

Implementation options for the response message.

| Scenario | Response message indicates | Details |
|---|---|---|
| 1 | Received signal strength (RSRP) or signal-to-interference-and noise (SINR) or other quality metric for the sidelink. | For example, it would be possible that the response message indicates, for the first RSs 191 transmitted on at least one or even multiple ones of the TX beams 301-306, the respective RSRP or SINR. Thereby, the UE 101 can conclude on the relative performance of multiple TX beams 301-306 with respect to each other. This helps to more accurately implement the beam adjustment 8002. |
| 2 | Beam identity | The response message could also be indicative of a beam identity of one or more strongest beams of the multiple TX beams 301-306. For instance, a descending or ascending sequence of multiple TX beams 301-306-sorted with |

TABLE 4-continued

Implementation options for the response message.

| Scenario | Response message indicates | Details |
|---|---|---|
| | | respect to, e.g., RSRP or SINR-could be signaled. |

Next, at box 9070, it is checked whether the second transmission 182 is activated. If the second transmission 182 is activated, then at box 9080 the UE 101 participates in the second transmission 182 by monitoring for the second RSs 192 transmitted by the UE 102. The UE 101 can then determine a receive property of the second RSs 192 based on said monitoring.

At box 9090, it is possible to adjust the preestablished beam pair of box 9020, or a previous iteration of box 9090. This is based on the receive property as indicated by the response message 9060 and/or the receive property is determined based on said monitoring for the second RSs 192 at box 9080.

The sequence of the boxes in FIG. 6 is only an example. Other sequences are conceivable. For instance, box 9010 may be executed after execution of box 9020. For example, boxes 9040-9060 may be executed after execution of boxes 9070-9080.

Figure 7:
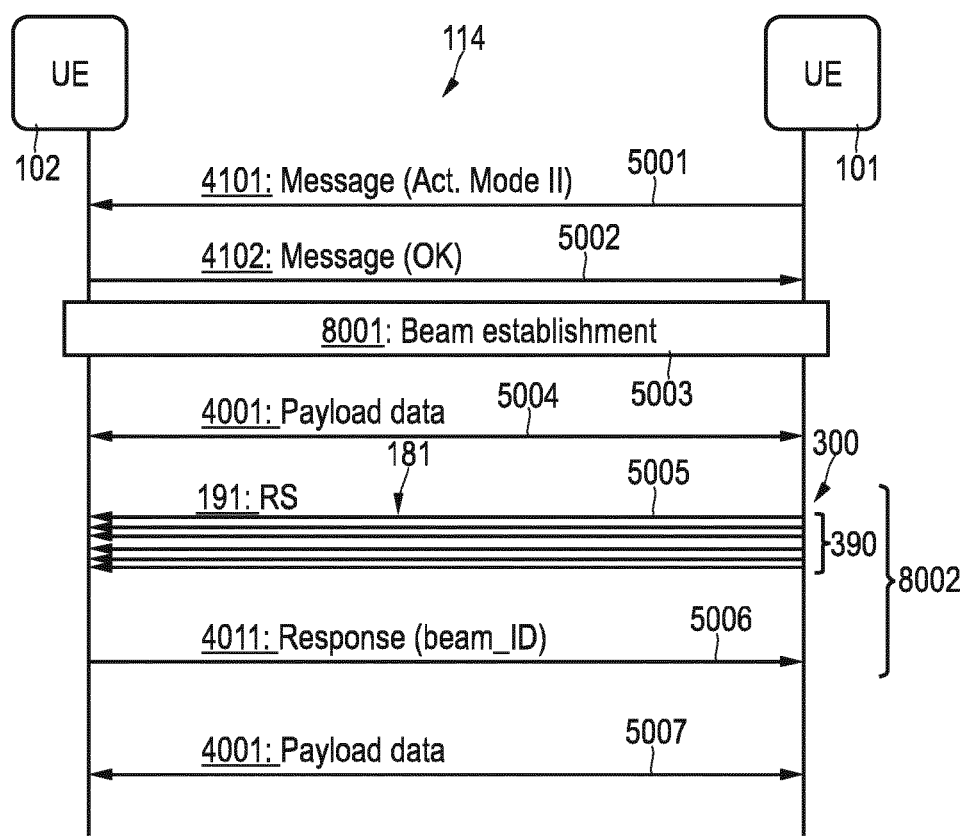
FIG. 7 is a signaling diagram of communication between two wireless communication devices on a D2D link according to various examples.

FIG. 7 is a signaling diagram of communication between the UE 101 and the UE 102 on the sidelink 114.

The signaling of FIG. 7 can implement the method of FIG. 6.

At 5001, the UE 101 transmits a message 4101 to the UE 102. In the example of FIG. 7, message 4101 is indicative of the activation of the operational mode II (cf. TAB. 2). As such, the message 4101 is indicative of activation of the first transmission 181.

The UE 102 transmits a message 4102 to the UE 101 and confirms the activation of the operational mode II, at 5002.

Such an implementation using the messages 4101-4102 is optional. Other scenarios are conceivable. For example, the message 4102 is optional. For example, in the illustrated scenario, the UE 101 acts as the master device responsible for the activation of the transmission 181 and/or the transmission 182. In other scenarios, the UE 102 may act as the master device, then the message 4101 may be transmitted from the UE 102 to the UE 101 (i.e., the UE 102 can decide for the UE 101 whether the UE 101 employs the first transmission 181 and/or the second transmission 182 for the beam adjustment 8002 at the UE 101).

Respective information designating the master device may be obtained by the UE 101 and the UE 102, e.g., based on a predefined rule or via the control link 110 from the RAN 109. For instance, the RAN 109 may designate the master device in an in-coverage scenario or a mixed-coverage scenario; while the UEs 101-102 may also autonomously designate the master device and on out-of-coverage scenario, e.g., based on a random selection scheme. For example, the master device may select the respective operational mode (cf. TAB. 2).

At 5003, the beam establishment 8001 is performed. An initial beam pair is determined. The beam pair is used for a payload transmission 4001 at 5004.

At 5005, the UE 101 and the UE 102 participate in the transmission 181 of the RSs 191, for the beam adjustment 8002. The UE 101 performs the TX beam sweep 300, i.e., the transmission 181 includes a burst of RSs 191. The beams 301-306 of the TX beam sweep 300 could be centered around the initial TX beam of the pre-established initial beam pair of the beam establishment 8001.

One or more RSs are transmitted per TX beam 301-306 of the TX beam sweep 300. The transmission 181 includes a single RX beam at the UE 102; i.e., the UE 102 does not perform a RX beam sweep. For instance, the UE 102 can select the RX beam in accordance with the initial beam pair.

At 5006, the UE 102 responds with the response message 4011, cf. TAB. 4. In the illustrated example, the strongest TX beam 301-306 of the TX beam sweep 300 is indicated (cf. TAB. 4, scenario 2).

The UE 101 can adjust the initial beam pair by selecting the strongest TX beam 301-306 and then perform a further payload transmission 4001 at 5007 using the adjusted beam pair.

In the scenario FIG. 7, there is a single TX beam sweep 300. In some examples, it is possible that the first transmission 181 includes multiple TX beam sweeps. Such a scenario is illustrated in FIG. 8.

Figure 8:
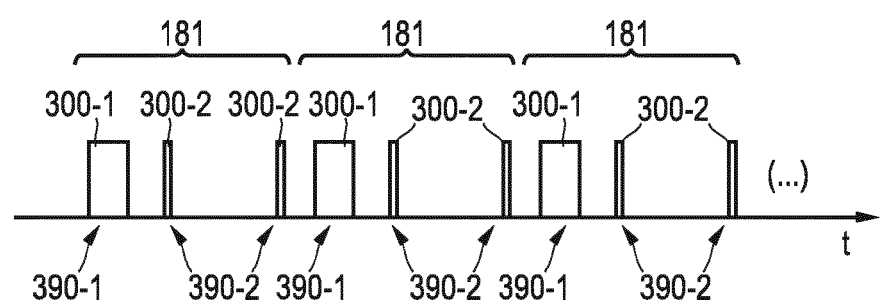
FIG. 8 schematically illustrates multiple beam sweeps implemented at a wireless communication device in a time-interleaved manner according to various examples.

FIG. 8 illustrates a scenario in which the first transmission 181 includes 2 TX beam sweeps 300-1, 300-2. The two TX beam sweeps 300-1, 300-2 include a different count of TX beams. For example, this can pertain to a coarse beam adjustment and a fine beam adjustment, depending on the count of TX beams.

Each one of the beam sweeps 300-1, 300-2 is time-aligned with a respective burst 390-1, 390-2 (cf. FIG. 4) of the first RSs 191. Different bursts 390-1, 390-2 can have different allocation schemes for the time-frequency resources, etc.

FIG. 8 also illustrates aspects with respect to the time-domain arrangement of the multiple TX beam sweeps 300-1, 300-2. The TX beam sweeps 300-1, 300-2 are arranged interleaved in time domain.

Respective properties associated with the multiple TX beam sweeps 300-1, 300-2 of the first transmission 181 can be indicated by the messages 4101, 4102 (cf. TAB 3: scenario 4). In particular, it would be possible that the count of beams is indicated by least one of the messages 4101, 4102 (cf. TAB. 3, scenario 1 and 5), e.g., implicitly by referring to the respective bursts 390-1, 390-2, or explicitly.

While FIG. 8 illustrates a scenario of multiple TX beam sweeps 300-1, 300-2 of the first transmission 181, similar scenarios can be readily applied for multiple RX beam sweeps of the second transmission 182 at the UE 101.

FIG. 8 illustrates a scenario in which the first transmission 181 is re-occurring in time at a fixed periodicity—and, along with this, both TX beam sweeps 300-1, 300-2 are re-occurring at a fixed periodicity. Hence, corresponding time-frequency resources may be persistently or semi-persistently scheduled, but other scenarios are conceivable. One example scenario is illustrated in FIG. 9.

Figure 9:
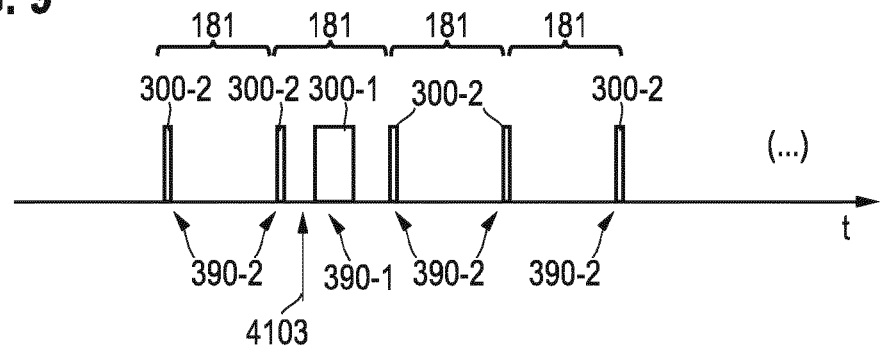
FIG. 9 schematically illustrates multiple beam sweeps implemented at a wireless communication device in a time-interleaved manner according to various examples.

FIG. 9 also illustrates a scenario in which the first transmission 181 includes two TX beam sweeps 300-1, 300-2. The two TX beam sweeps 300-1, 300-2 include a different count of TX beams.

In particular, the TX beam sweep 300-1 includes an extended count of beams, wherein the TX beam sweep 300-2 includes a default count of beams. Here, the time-frequency resources for the TX beam sweep 300-2 are persistently scheduled, while the TX beam sweep 300-1 is scheduled on-demand by a message 4103. Thus, the TX beam sweep 300-1 can be labeled aperiodic.

In other words, the re-occurring first transmission 181 includes the TX beam sweep 300-2 by default; and includes the TX beam sweep 300-1 on demand.

As a general rule—with reference to FIG. 8 and FIG. 9—it would be possible that the multiple beam sweeps 300-1, 300-2 employ beams having different beam width.

Figure 10:
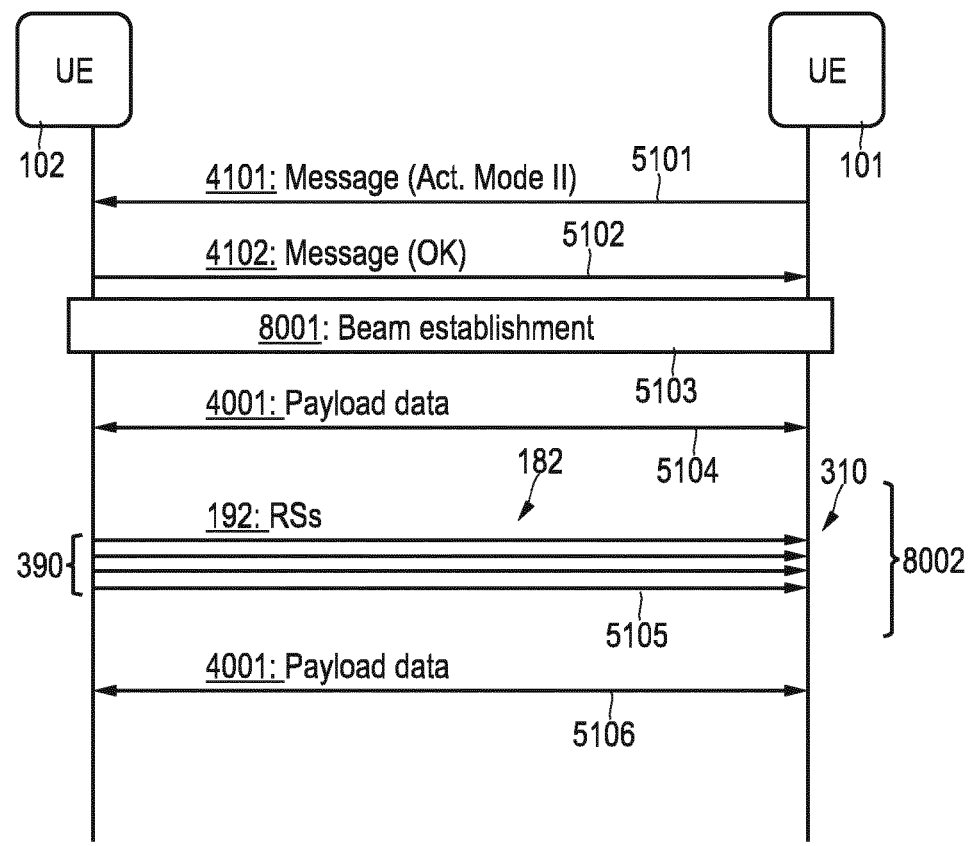
FIG. 10 is a signaling diagram of communication between two wireless communication devices on a D2D link according to various examples.

FIG. 10 is a signaling diagram of communication between the UE 101 and the UE 102 on the sidelink 114.

The signaling of FIG. 10 can be in accordance with the method of FIG. 6. 5101-5104 correspond to 5001-5004, respectively (cf. FIG. 7).

At 5105, the UE 101 and the UE 102 both participate in the second transmission 182 of the RSs 192. The UE 102 transmits the RSs 192, e.g., by implementing a respective burst 390 of the RSs 192. For instance, the message 4101 could indicate the count of the RSs 192 included in the burst 390 (cf. TAB. 3, scenario 1). The UE 101 monitors for the RSs 192, 5105. The second transmission 182 includes the RX beam sweep 310 at the UE 101. The RX beam sweep 310 is aligned in time domain with the burst 390 of the second transmission 182 implemented at the UE 102. I.e., the UE 101 can switch between the different RX beams 311-316 in accordance with a timing of the burst. The UE 102 may use a single TX beam, e.g., the TX beam defined by the beam establishment at 5103, for transmitting the RSs 192 at 5105.

As a general rule, referring to FIG. 7 and FIG. 10, it would be possible that the beam sweeps 300, 310 of the first and second transmissions 181, 182 implemented at the UE 101 have a comparably limited count of beams. In particular, the count of beams used for the beam sweeps 300, 310 during the beam adjustment 8002 can be smaller than the count of beams for one or more establishment beam sweeps used during the beam establishment 8001. For example, typically, the count of beams used for one or more beam sweeps during the beam establishment 8001 may be larger than 10 or even larger than 50. In contrast, the count of beams used for the one or more beam sweeps during the beam adjustment 8002 may be smaller than ten or even smaller than six. In other words, the UE 101 may refrain from using all available beams; typically, the hardware capability of the interface 1012 defines the count of available beams.

Figure 11:
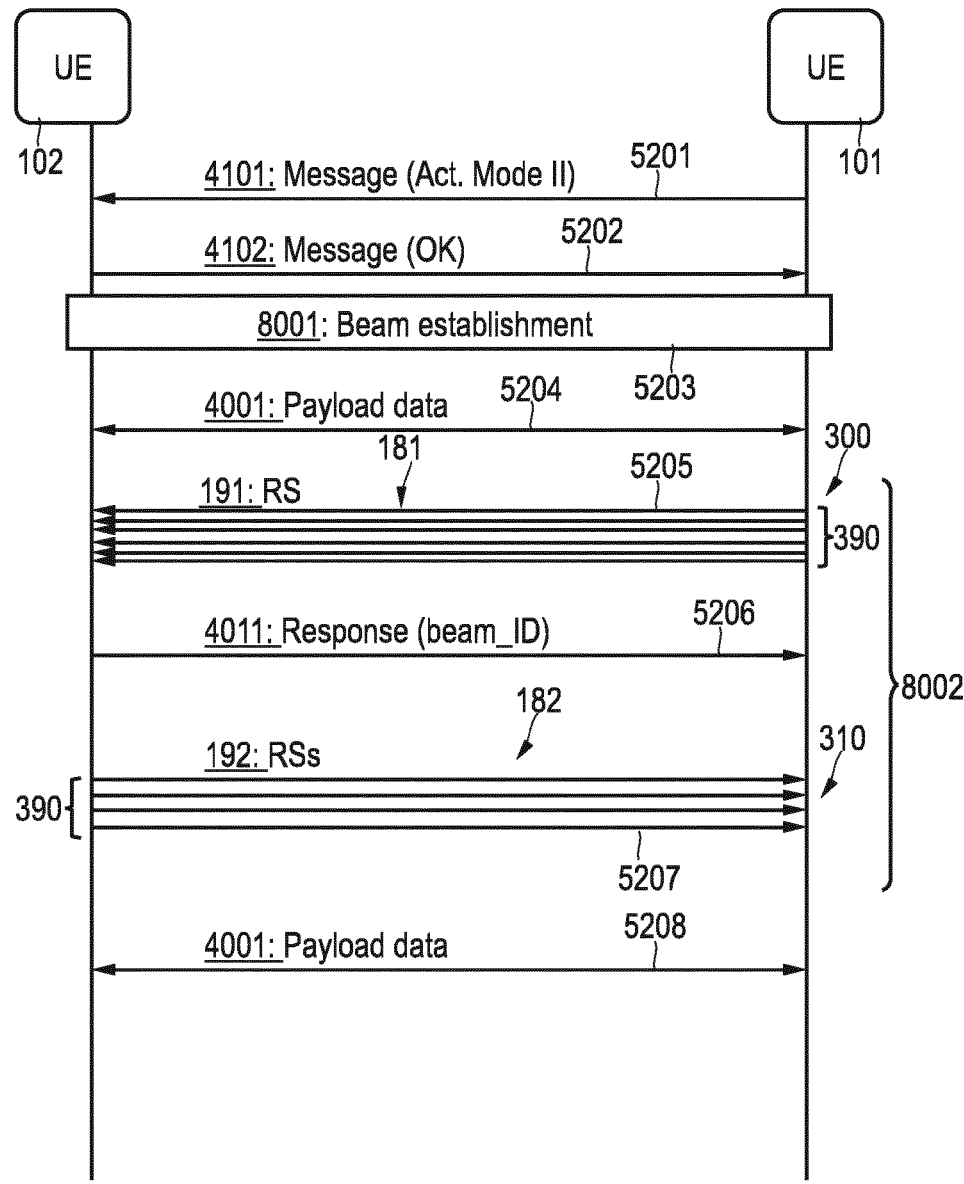
FIG. 11 is a signaling diagram of communication between two wireless communication devices on a D2D link according to various examples.

As a general rule, it would be possible to implement both the first transmission 181, as well as the second transmission 182 (cf. TAB. 2: mode III). This is illustrated in FIG. 11. Here, 5201-5206 correspond to 5001-5006, respectively. 5207 corresponds to 5105. 5208 corresponds to 5106 and 5007.

Figure 12:
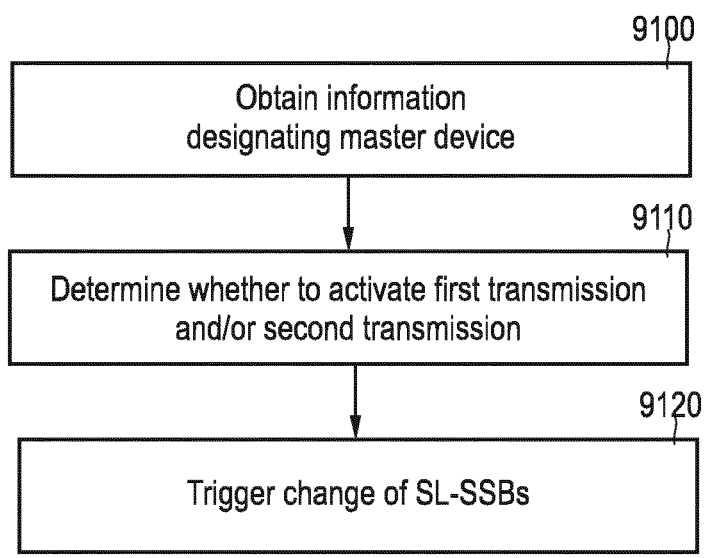
FIG. 12 is a flowchart of a method according to various examples.

FIG. 12 is a flowchart of a method according to various examples. The method of FIG. 12 may be executed by a master device. The method of FIG. 12 is for configuring beam management at the UE 101. For instance, the master device may be the UE 101 or even the UE 102. It would also be possible that the master device is implemented by a node of a cellular network, e.g., by a base station of the RAN 109. Hereinafter, for sake of simplicity, FIG. 12 will be explained in connection with an implementation in which the method is executed by the UE 101, but other scenarios are possible.

At box 9000, the UE 101 can obtain respective information designating the UE 101 as the master device, e.g., from a negotiation process with the UE 102 or from the RAN 109. As a general rule, it would be possible that the UE 101 and the UE 102 agree upon the role of the master device. It would also be possible that the master device is designated by the RAN 109.

Thus, a flexible designation of the master device is conceivable.

The method of FIG. 12 may, e.g., precede the method of FIG. 6, or at least partly overlap with the method of FIG. 6.

At box 9110, the UE 101 determines whether to activate the first transmission 181 and/or the second transmission 182. As such, the at least one message communicated at box 9010 of the method of FIG. 6 may reflect an outcome of the determination at box 9110.

I.e., the UE 101—responsible for the activation, as the master device—can determine whether to activate or deactivate the first transmission 181 of the RSs 191; and can determine whether to activate or deactivate the second transmission 182 of the RSs 192. For instance, the UE 101 could select between one of the operational modes I-IV of TAB. 3.

As a general rule (e.g., irrespective of the particular choice of the master device), various decision criteria can be considered when determining whether to activate the first transmission 181 and/or the second transmission 182. Some of the decision criteria are listed below in table 5.

TABLE 5

Decision criteria for activation of the first transmission 181 and/or the second transmission 182. Multiple such decision criteria can be used in an aggregated manner. There may be a prioritization between different one of such decision criteria.

| Decision criterion | Explanation |
| --- | --- |
| Channel quality | For instance, depending on the channel quality, the first transmission 181 and/or the second transmission 182 may be activated. |
| Mobility level | For instance, if the mobility level of, both, the first UE 101 and the second UE 102 is below a threshold, then it would be possible to activate at least one of the first transmission 181 and/or of the second transmission 182. Conversely, the mobility level of at least one of the UE 101 and the UE 102 exceeds a threshold, then there may be a tendency to use beam establishment 8001 rather than beam adjustment 8002. At significant mobility levels, there can be significant and fast changes in the required beam pair such that the initial assumption of the preestablished beam pair has only a limited validity duration. In other examples, it would be possible to execute the beam adjustment 8002 more often or, e.g., increase the solid angle covered by the beam sweeps at the UE 101, e.g., by increasing the count of beams of the beam sweeps depending on the mobility level and/or a predicted movement of the UE 101. |
| Interference level | For instance, if the interference level of the sidelink 114-e.g., caused by other devices accessing the spectrum-is exceeding a certain threshold level, then it may be appropriate to use the second transmission 182, rather than the first transmission 181, because the second transmission 182 is characterized by the RX beam sweep at the UE 101 and does not require a TX beam sweep that spatially distributes additional interference on top of the interference level already present. |
| BC capability | For instance, if there is a BC capability at the UE 101 (e.g., if TDD is used), then it may be possible to activate either one of the first transmission 181 or the second transmission 182. On the other hand, if there is no BC capability, then it may be preferable to activate, both, the first transmission 181, as well as the second transmission 182, or even rely on the full establishment beam sweeps of the beam establishment 8001. For example, BC capability may depend on one or more of the following parameters: TDD or FDD; distance between uplink and downlink bands for FDD; signal quality on the sidelink. |

Box 9010 may be re-executed from time to time, e.g., to account for changes in the conditions underlying the one or more decision criteria. One example would be that the second transmission 182 is activated and the first transmission 181 is deactivated, but upon experiencing link degradation of the sidelink 114, the second transmission 182 is deactivated and the first transmission 181 is activated. A similar mechanism is that when the first transmission 181 is activated and the second transmission 182 is deactivated, and a stable condition of the sidelink 114 is experienced, then the first transmission 181 can be deactivated and the second transmission 182 can be activated.

Next, at box 9120,—upon activation of the at least one of the first transmission 181 or the second transmission 182—it would be possible to trigger a change of a time domain density of beacon RSs that are periodically scheduled on the sidelink 114, e.g., sidelink SS blocks (SL-SSBs). For example, upon activation of the first transmission 181 and/or of the second transmission 182, this may correspond to scheduling the RSs 191 and/or the RSs 192, such that for the purpose of beam management there are sufficient RSs 191, 192 available. Then, it may not be required to have a significant number of additional beacon RSs and the time-domain density can be decreased.

The triggering of the change of the time-domain density can be implemented differently in different scenarios. In one example, e.g., in an out-of-coverage scenario, it would be possible that the UE 101 and the UE 102 autonomously agree on the change in the time-domain density. In other scenarios, a corresponding request may be transmitted via the control link 110 to the RAN 109.

Figure 13:
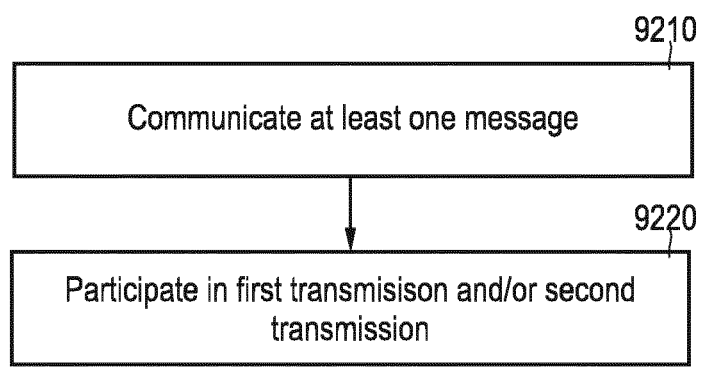
FIG. 13 is a flowchart of a method according to various examples.

FIG. 13 is a flowchart of a method according to various examples. For instance, the method of FIG. 13 can be executed by a UE. The example of FIG. 13 will be described by a scenario in which the method is executed by the UE 102, e.g., by the processor 1021 upon loading program code from the memory 1025 (cf. FIG. 3).

The method of FIG. 13 is for assisting the UE 101 in the beam adjustment 8002 at the UE 101.

At box 9210, at least one messages communicated, the at least one message being indicative of an activation of the first transmission 181 and/or of the second transmission 182. Thus, box 9210 is interrelated with box 9010.

At box 9220, the UE 102 participates in the first transmission 181 and/or the second transmission 182, based on the at least one message communicated at box 9210.

Figure 14:
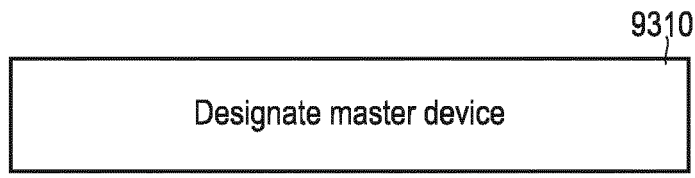
FIG. 14 is a flowchart of a method according to various examples.

FIG. 14 is a flowchart of a method according to various examples. For example, the method of FIG. 14 can be executed by a base station of the RAN 109, e.g., by a respective processor, upon loading program code from a respective memory.

At box 9310, a master device is designated. For instance, the UE 101 or the UE 102 could be designated as master device. It would also be possible that the base station designates itself as the master device.

The master device is responsible for the activation of the first transmission 181 and/or the second transmission 182. It would be possible that corresponding information being indicative of the master device is determined. This can form the basis of box 9100 of FIG. 12.

Summarizing, above, at least the following techniques have been described.

Sidelink control channel instructions for activation of one or more transmissions of RSs, including a first transmission from a first UE to a second UE and the second transmission from the second UE to the first UE. This can be aligned with mode selection for beam management. The first UE can be aware of the respective mode for beam management selected at the second UE, and vice versa.

SL control channel instruction for a number of RX beams, e.g., by specifying a count of resources allocated to the RSs and how they are located in a time-frequency resource grid.

SL control channel instruction for a number of TX beams, e.g., by specifying a count of resources allocated to the RSs and how they are located in a time-frequency resource grid.

SL control channel instruction for an extended beam sweep (not a full establishment beam sweep, i.e., including fewer beams that a full establishment beam sweep). A corresponding request for the extended beam sweep can provide an on-demand allocation of resources. It would also be possible to persistently schedule the resources at a lower rate than a default beam sweep having a smaller count of beams than the extended beam sweep. The extended beam sweep may be performed occasionally.

A response message may feedback information on the best TX beam on the SL control channel. Optionally, information for multiple TX beams may be fed back.

A RAN control link can be used to define one UE as master device and one or more further UE as slave devices, e.g., with respect to the determination which transmissions to activate.

Signaling from one or more UEs to the RAN to indicate that the activity of the beacon RSs can be reduced (e.g., by reducing the amount of SL-SS blocks (SL-SSBs) and/or SL-SS bursts, and/or by extending the SL-SS block periodicity, or the SL-SSB beacon can be shut completely. A corresponding request to activate the SL-SSBs, or to increase its activity level.

The technical effect is that the UEs can maintain a high-quality beam pair without the need of a full beam sweep as in beam establishment. This has the advantage of requiring less overhead, in terms of resources spent on RSs.

A further technical effect is that interference experienced by other devices can be reduced by using RX beam sweeps (only).

A further technical effect is that the RSs need not to be SL-SSBs, which then reduces overhead.

Summarizing, at least the following EXAMPLEs have been described above.

EXAMPLES

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

For illustration, above, various options have been described with respect to beam management at the UE 101. Similar techniques may be readily applied with respect to beam management at the UE 102. However, beam management at the UE 102 may be decoupled from the beam management at the UE 101, and vice versa.

For further illustration, above, various option have been described in which resources for one or more beam sweeps are persistently or semi-persistently schedule. Other options for scheduling are available, e.g., on-demand scheduling or periodic scheduling.

For still further illustration, various examples have been described in connection with the implementation of the D2D link by a sidelink of a RAN. Similar techniques may be readily applied for other kinds and types of D2D links, e.g., in WiFi or Bluetooth communication protocols. In some examples, it would even be possible to employ the techniques described herein to other wireless links, beyond D2D links.

For further illustration, above, various examples have been described in which a burst of RSs is followed by payload data transmission. It would also be possible that the burst of RSs and the payload data transmission are at least partly executed in parallel. I.e., the burst can be distributed over time with longer gaps in time-domain between adjacent RSs of the burst.

The invention claimed is:

1. A method of operating a first wireless communication device communicating with a second wireless communication device on a device-to-device link in accordance with a pre-established beam pair, the method comprising:
communicating at least one message indicative of an activation of at least one of:
a first transmission of first reference signals from the first wireless communication device to the second wireless communication device, the first transmission comprises at least one burst of the first reference signals, or
a second transmission of second reference signals from the second wireless communication device to the first wireless communication device,
wherein the activation of the at least one of the first transmission or the second transmission being for use in beam adjustment of the pre-established beam pair at the first wireless communication device, and
participating in the at least one of the first transmission or the second transmission based on the communicated at least one message, wherein the at least one message is indicative of a count of the first reference signals for each one of the at least one burst of the first transmission.

2. The method of claim 1, wherein the first transmission comprises at least one transmit beam sweep at the first wireless communication device, the at least one transmit beam sweep being aligned with the at least one burst of the first transmission.

3. The method of claim 2, wherein the first transmission comprises a single receive beam at the second wireless communication device for each one of the at least one burst of the first transmission, the single receive beam at the second wireless communication device being in accordance with the pre-established beam pair.

4. The method of claim 1,
wherein the second transmission comprises at least one burst of the second reference signals,
wherein the at least one message is indicative of a count of the second reference signals for each one of the at least one burst of the second transmission.

5. The method of claim 4, wherein the second transmission comprises at least one receive beam sweep at the first wireless communication device, the at least one receive beam sweep being aligned with the at least one burst of the second transmission.

6. The method of claim 5, wherein the second transmission comprises a single transmit beam at the second wireless communication device for each one of the at least one burst of the second transmission, the single transmit beam at the second wireless communication device being in accordance with the pre-established beam pair.

7. The method of claim 1, further comprising:
receiving, in response to participating in the first transmission, a response message from the second wireless communication, the response message being indicative of a receive property of the first reference signals at the second wireless communication device.

8. The method of claim 7,
wherein the first transmission comprises at least one transmit beam sweep at the first wireless communication device,
wherein the response message is indicative of the receive property of the first reference signals for multiple transmit beams of the at least one transmit beam sweep.

9. The method of claim 7, wherein the response message is indicative of a beam identity of at least one strongest transmit beam of the multiple transmit beams.

10. The method of claim 1,
wherein the at least one of the first transmission or the second transmission comprises at least one beam sweep at the first wireless communication device,
wherein the pre-established beam pair is established based on an establishment beam sweep,
wherein a count of beams of each one of the at least one beam sweep is smaller than a count of beams of the establishment beam sweep.

11. The method of claim 1,
wherein the at least one of the first transmission or the second transmission comprises at least one beam sweep at the first wireless communication device,
wherein the at least one message is indicative of a count of beams of each one of the at least one beam sweep.

12. The method of claim 1,
wherein the at least one of the first transmission or the second transmission comprises multiple beam sweeps at the first wireless communication device,
wherein the multiple beam sweeps are arranged interleaved in time domain and comprise different counts of beams.

13. The method of claim 1, further comprising:
in response to the activation of the at least one of the first transmission or the second transmission, triggering a change of a time-domain density of resources allocated to periodically scheduled further reference signals.

14. The method of claim 1, further comprising:
wherein the activation of the at least one of the first transmission or the second transmission is based on a channel quality of communication on the device-to-device link.

15. The method of claim 1, further comprising:
based on a receive property of at least one of the first reference signals or the second reference signals, performing the beam adjustment of the pre-established beam pair.

16. A first wireless communication device configured to communicate with a second wireless communication device on a device-to-device link in accordance with a pre-established beam pair,
  wherein the first or second wireless communication device comprises control circuitry configured to:
  communicate at least one message indicative of an activation of at least one of:
    a first transmission of first reference signals from the first wireless communication device to the second wireless communication device, the first transmission comprises at least one burst of the first reference signals, or
    a second transmission of second reference signals from the second wireless communication device to the first wireless communication device,
  wherein the activation of the at least one of the first transmission or the second transmission being for use in beam adjustment of the pre-established beam pair at the first wireless communication device, and
  participate in the at least one of the first transmission or the second transmission based on the communicated at least one message, wherein the at least one message is indicative of a count of the first reference signals for each one of the at least one burst of the first transmission.

* * * * *